(12) United States Patent
Burns et al.

(10) Patent No.: US 7,295,297 B2
(45) Date of Patent: Nov. 13, 2007

(54) IMAGE SENSING WHEEL ALIGNMENT SYSTEM

(75) Inventors: Leigh R. Burns, Troy, IL (US); Daniel R. Dorrance, Ballwin, MO (US); Mark S. Shylanski, St. Louis, MO (US); Thomas J. Golab, St. Peters, MO (US); David A. Voeller, St. Louis, MO (US)

(73) Assignee: Hunter Engineering Company, Bridgeton, MO (US)

( * ) Notice: Subject to any disclaimer, the term of this patent is extended or adjusted under 35 U.S.C. 154(b) by 287 days.

(21) Appl. No.: 10/857,781

(22) Filed: May 28, 2004

(65) Prior Publication Data

US 2004/0246470 A1 Dec. 9, 2004

Related U.S. Application Data

(63) Continuation-in-part of application No. 10/260,952, filed on Sep. 30, 2002, now Pat. No. 6,744,497, which is a continuation of application No. 09/566,247, filed on May 5, 2000, now Pat. No. 6,509,962.

(51) Int. Cl.
*G01B 11/275* (2006.01)
*G01C 1/04* (2006.01)

(52) U.S. Cl. .................... 356/139.09; 356/155

(58) Field of Classification Search ........... 356/139.09, 356/155

See application file for complete search history.

(56) References Cited

U.S. PATENT DOCUMENTS 4,302,104 A 11/1981 Hunter ...................... 356/152

| | | | |
|---|---|---|---|
| 5,018,853 A | 5/1991 | Hechel et al. | 356/155 |
| 5,471,515 A | 11/1995 | Fossum et al. | |
| 5,488,471 A | 1/1996 | McClenahan et al. | 356/139.09 |
| 5,519,489 A | 5/1996 | McClenahan et al. | 356/139.09 |
| 5,535,522 A | 7/1996 | Jackson | |
| 5,724,743 A | 3/1998 | Jackson | |
| 5,796,094 A | 8/1998 | Schofield et al. | |
| 5,841,126 A | 11/1998 | Fossum et al. | |
| 6,064,750 A | 5/2000 | January et al. | 382/103 |
| 6,252,973 B1* | 6/2001 | January et al. | 382/100 |
| 6,498,959 B1 | 12/2002 | January et al. | |
| 6,894,771 B1* | 5/2005 | Dorrance et al. | 356/139.09 |
| 2004/0165180 A1* | 8/2004 | Voeller et al. | 356/139.09 |

OTHER PUBLICATIONS

Hunter Engineering Company, DSP400 Alignment Sensors, 2001, 8 pgs.

(Continued)

*Primary Examiner*—Isam Alsomiri
(74) *Attorney, Agent, or Firm*—Polster, Lieder, Woodruff & Lucchesi, L.C.

(57) ABSTRACT

An improved image sensing wheel alignment system for calculating vehicle wheel alignments having a detector array for receiving an input image containing vehicle wheel alignment information. An image sensor controller controls the detector array to receive the input image during an acquisition period, the image sensor controller examining signals from the image detecting elements individually at a plurality of times during the acquisition period to determine exposure levels for image detecting elements. An output image from the image detecting elements at the end of the acquisition period contains wheel alignment information for use in calculating vehicle wheel alignments.

32 Claims, 6 Drawing Sheets

OTHER PUBLICATIONS

Hunter Engineering Company, DSP400 Alignment Sensors Operation Instructions, Preliminary, 1998, 35 pgs.
Snapon Technologies, Inc./John Bean, Visualiner 3D, 1997, 6 pgs.
John Bean Company, V3DN with Pro32 Alignment Software, 1999, 1 pg.
Hunter Engineering Company, DSP600 Alignment Sensors, 2003, 8 pgs.
Phillips Consumer Electronics, Monochrome Imaging Module VCM3250/00 VC325050, 2 pgs.
Phillips Consumer Electronics, Monochrome CCD Camera Module VCM 3250, 2005, 2 pgs.
IEEE, Proceeding Index, 5 pgs., Jul. 11, 2005.
Kempainen, Stephen, CMOS Image Sensors: Eclipsing CCDs in Visual Information?, EDN Magazine, EDN Access, 1997, 9 pgs.
Bursky, Dave, Electronic Design, Highly Integrated Image Sensors Cut System Cost, Complexity, 1999, 5 pgs.
Liebman, Sheldon, Photon Vision Systems Creates CCD Performance with CMOS Value, Advanced Imaging, 1999, 2 pgs.
Electronics Products, Single-Chip Camera See In Color, 1999, 2 pgs.
Sensors, CMOS Camera-On-A-Chip Has Solved Noise Problems, 2000, 1 pg.
Hewlett Packard, Integrated CMOS Image Sensor with Digital Output and Timing Controller, (640×480 Resolution), 1998, 2 pgs.
IMEC, Datasheet RAMAP1D, 1999, pp. 1-14.
IMEC, IRIS-1 Integrated Radiation-Tolerant Imaging System, 1999, pp. 1-8.
PHOTOBIT, PB-0720 2/3 Inch CMOS Active-Pixel Digital Image Sensor, 1999, pp. 1, 3-47.
Photon Vision Systems, High Performance Area CMOS Image Sensors ACS-I XXXX Family, ACS-I 512, 1024, 2048-CPGA, -POLY Integrated Imaging System on a Chip, Digital Output, 1999, pp. 1-20.
ST, VV5500-VV6500 Multi Format Digital Output Sensor, Customer Data Sheet, 1999, 2 pgs.
Image Sensors Datasheets, IBIS4b CMOS Integrating Active Pixel Sensor (APS), 1999, pp. 1-7.
Electronic Products, CMOS Color Image Sensor Replaces CCDs, 2000, pp. 1-2.
Pixel CAM, PCM2112 1280×1024 CMOS Color Imaging Front End Module, 2000, 2 pgs.
Ascierto, Jerry, Mixing a Low-Cost Pixel Fix, Silicon Valley Start-Up Fires Shots in Sub-$500 Digital Camera War, ElectronicNewsOnline, 2000, 2pgs.
MOTOROLA, Inc., Advanced Tri-Linear CMOS Image Sensor Plus Image Capture Processing Engine, 1998, 6 pgs.
MOTOROLA, Inc., Product Overview, 2752X5 Advanced Tri-Linear CMOS Image Sensor Plus Image Capture Processing Engine, 1998, pp. 1-31.
Dierickx, Bart, Introduction to CMOS Image Sensors, The Society for Imaging Science and Tehcnology, 1999, pp. 1-66.
Wong, H.S. Phillip, Overview of CMOS Image Sensors The International Society for Optical Engineering, pp. 1-67, Nov. 10, 1998.
EE Design Center, Questlink Technology, Product Listing, 1999, pp. 1-5.
PHOTOBIT, Product Listing, 1999, 4 pgs.
Halloran, M. & Polderdijk, F., ANFT18 Camera Electronics for the FT18 CCD Image Sensor, Phillips Electronics, 2000, pp. 1-35.
OPTICS.ORG, Market Report: CCD Makers Sit Up and Take Notice of CMOS, 2001, 5 pgs.
ST, SXGA Resolution Digital Video CMOS Image Sensor, 2002, pp. 1-13.
CONEXANT, 1.3 Megapixel CMOS Image Sensor for Superior Quality Digital Still and PC Video Camers, Datasheet, 2 pgs., May 24, 2000.
ECN, CMOS Sensor for High-Performance Video Cameras, New Product Horizons, 2001, 2 pgs.
IC MEDIA, ICM108T 1.3 Million Pixel CMOS Image Sensor, Data Sheet, 2003, pp. 1-19.
MOTOROLA, Inc., Advance Information ¼' Color CIF Image Sensor (A Series), 1998, pp. 1-22.

* cited by examiner

IMAGE SENSING WHEEL ALIGNMENT SYSTEM

CROSS-REFERENCE TO RELATED APPLICATIONS

This application is a continuation in part of U.S. application Ser. No. 10/260,952, Sep. 30, 2002 now U.S. Pat. No. 6,744,497, which is a continuation of U.S. patent application Ser. No. 09/566,247 filed May 5, 2000, now U.S. Pat. No. 6,509,962.

STATEMENT REGARDING FEDERALLY SPONSORED RESEARCH OR DEVELOPMENT

Not Applicable.

BACKGROUND OF THE INVENTION

1. Field of the Invention

This invention relates generally to vehicle wheel alignment systems and, more particularly, to image sensors and processors that are used to determine the angles of vehicle wheels and the distances between vehicle wheels.

2. Related Art

Aligning vehicle wheels within specific tolerances is important for optimal control of the vehicle and for consistent wear of the tires. Alignment is performed primarily by adjusting camber, caster, toe, and steering axis inclination. As part of calculating the alignment angles for the vehicle, the angles of the wheels must be determined. The angles can be determined relative to an external reference, such as found in machine vision systems, or relative to the other wheels, such as found in wheel-mounted systems. It is known that these angles can be measured using an electro-optical transducer that incorporates a solid state detector array. In the case of machine vision systems, the detector array may have multiple columns and rows forming an area to capture a two-dimensional image, and in the case of wheel-mounted systems, the detector array may only need to be linear, having a single row with as few as two receptor elements. (In the present application, an "element" may include one or more pixels.) In either case, the image on the detector must be analyzed meticulously so that accurate alignment angles can be calculated.

Wheel-mounted alignment systems typically have sensor heads on each wheel of the vehicle, and each sensor head has an emitter and a receiver that works in combination with at least one other sensor head along the vehicle's sides and across the vehicle. The receiver units may have photodiodes as set forth in U.S. Pat. No. 4,302,104 or a charge coupled device (CCD) as set forth in U.S. Pat. Nos. 5,018,853 and 5,519,489, and the emitter units may have a single source as in U.S. Pat. Nos. 4,302,104 and 5,018,853 or multiple sources as in U.S. Pat. No. 5,488,471. The disclosures of these patents are incorporated herein by reference. Angles and distances are calculated according to the positions of the spots or lines that are detected by the linear arrays.

Machine vision alignment systems typically use a solid state camera with an array detector mounted some distance away from the vehicle to obtain an image of a wheel mounted target. The target incorporates an accurately reproduced pattern that has known control features, as set forth in U.S. Pat. No. 6,064,750, incorporated herein by reference. The position of the features in the image are found and the orientation of the wheel can be calculated by well known algorithms. Some machine vision systems do not use a predefined target but identify particular geometric features on the wheel or tire, such as raised lettering or the circular wheel rim, and use characteristics of the geometric features, such as area, height, width, centoid, corner location, etc., to determine positions and orientations. Co-assigned U.S. patent application Ser. No. 10/439,153, the disclosure of which is incorporated herein by reference, discloses such a system.

In wheel alignment systems, the imaging requirements are somewhat different than a standard camera. Very precise measurements are preferably made at a rate of at least 2 Hz. on static or very nearly static scenes. (Of course, sampling frequencies even slower than 2 Hz could also be used.) This requires stable, low-noise images that have excellent focus and contrast. The accuracy of the measurement depends on the precision with which edges, centroids, corners, lines or boundaries can be determined. Methods for analyzing the image must take into account the possible sources of inaccuracy and compensate for them. To obtain these images, current wheel alignment systems use analog receivers that cannot be integrated onto an application specific integrated circuit (ASIC) with the image processor or the analog to digital converter.

CCD technology has become the dominant method for constructing the solid state receiver arrays. While many alignment systems have been made using CCD elements, the detector has some characteristics that are not ideal for a robust economical product. The CCD element is an expensive component that requires additional support electronics to create a digital output for processing or imaging. It requires a number of timing and control signals as inputs, many of which require different voltages. Supply voltages, clock phases and control signals must be carefully controlled so that extraneous electrical noise is not introduced into the system. The analog output of the CCD element must be converted to a digital format using a separate amplifier and an analog-to-digital converter.

The pixel structure of a CCD element also makes it susceptible to blooming. When light falls on each pixel, photons are converted to electrons which accumulate in the active area of the pixel. If the light is intense or the amount of time the electrons are allowed to accumulate is long, the capacity of the pixel structure to hold the charge will be exceeded. The charge then spills into adjacent pixels and blooming occurs. Most CCD elements have some form of anti-blooming control which minimizes the problem, but it cannot be fully prevented.

There are essentially three different types of CCD structures which may be used in wheel alignment systems, and each type has particular disadvantages. The interline transfer CCD structure has alternating rows or columns of pixels and collectors resulting in a low fill factor and making it susceptible to distortion. Between each row or column of pixels is a row or column for shifting the pixel charge, thereby reducing the photosensitive area to a small percentage of the sensor's total area. This low fill factor may distort intensity profiles, thereby increasing the possibility in machine vision systems that edges and centroids of objects in the image are improperly located. The full frame CCD structure has a high fill factor but requires an external shutter to control the integration time of the device. The extra cost and complexity of the shutter is detrimental for an economical system. A frame transfer CCD structure does not require a shutter and can have very high fill factors but can be susceptible to creating image smear since the exposure is controlled by shifting the entire image into a light protected storage area after the integration time period has elapsed. The shifting process takes place one line at a time so the last line into storage has been shifted through every other line position on the image. The shift is not instantaneous so some new charge is collected with every shift until the light protected area is reached. This smear effect is not usually a problem if the image transfer time is a small fraction of the total integration time. Where system cost is an issue, high frame rates are not possible and the effects of smear must be considered.

Additionally, with all CCD elements, it is not possible to address an individual pixel for read out. If the object of interest only occupies a small portion of the image, it is necessary to read out the entire image before the object can be analyzed. The lack of sub-array read out capability imposes a speed penalty on the system.

As evident from the above discussion, the use of a CCD for an image sensor puts some burdens on the wheel alignment system in terms of electronic design considerations. The result of these restrictions is increased system cost and loss of flexibility.

There are other imagers on the market that address some of these problems. For example, CMOS imagers are available that address some of the blooming problems.

Current CMOS imagers generally have two types of electronic shutter control or exposure control. Both of these types specify the exposure for the entire array with the goal of trying to keep the exposure uniform across the array. The first type is commonly referred to as a snap shot mode or still mode. This mode is generally used to acquire a single image at a time. In this mode the imager array is initially reset (pixel wells are cleared of all charge), then the imager array is allowed to integrate light and accumulate charge for a period of time, then the imager array is clocked out.

The disadvantage of these snap shot modes is the array is active and still integrating while being clocked out. This can cause a general intensity gradient across the image which is undesirable. At additional cost and complexity a mechanical shutter can be used to block the light during the clock out stage. Alternately a light source (flash) can be turned on during the integration phase to increase the light level, then turned off during the clock out phase to reduce the effect of integrating light during the clock out phase.

The second general exposure mode is referred to as video mode, or rotating shutter, or continuous shutter. This mode is generally used for continuous video applications. In this mode the exposure is controlled on a row-by-row basis. In order to describe how these modes work, it is helpful to first define the term "row time" which is the time required to clock out a single row. By way of illustration, assume an imager specifies its exposure in increments of row times. First the entire imager array is placed in a reset state. Then starting at the top of the imager, the first row is allowed to integrate for a specified number of row times. Meanwhile, after one row time has expired, the second row is allowed to start integrating. After another row time has expired the third row is allow to start integrating and this continues down the array. Now when the specified integration time has expired for the first row, it is then clocked out, and then reset. Immediately thereafter the second row is clocked out then reset and this continues down the array where the operation then wraps back around to the top and continues. One way to think of this mode is to visualize an exposure window (where the array is integrating) that travels from the top of the array to the bottom and then rotates around back to the top, and the row following the exposure window is clocked out and reset until the exposure window wraps back around.

The rotating shutter mode has an advantage over snap shot mode in that the pixels are only exposed for the specified integration time so there is not additional unwanted light as with snap shot mode. The disadvantage of rotating shutter mode is if something moves in the scene, there will be a discontinuity in the image because the bottom pixels are being integrated at a different time than the top pixels. Also there is a maximum limit to the integration time that is dependent on the size of the image being acquired and the desired frame rate. The integration time can be expanded by specifying a larger image or by adding more blanking time between frames, but this slows down the overall frame rate. The other disadvantage of the rotation shutter is when a camera wants to acquire a single frame, the software has to wait for the next top of frame before acquiring the image. Additionally if using external lighting, the lights have to be turned on when the first row is being integrated and left on until the entire array has been clocked out. This can be difficult to coordinate and typically the lights are on longer than would be required for a similar exposure in snap shot mode. The brighter lights can be irritating to the user of the camera system.

Recently, a paper by Acosta-Serafini, P. M.; Masaki, I.; Sodini, C. G. ("A ⅓" VGA Linear Wide Dynamic Range CMOS Image Sensor Implementing a Predictive Multiple Sampling Algorithm with Overlapping Integration Intervals", IEEE 2003 Custom Integrated Circuits Conference, pp. 485ff.) described a method where the integration time of a pixel or group of pixels can be controlled individually. This is quite different from what is described above. The paper describes a technique for finding and controlling optimum integration time at each pixel site. The goal of the paper was to produce a high dynamic range imager. The technique for controlling the exposure at individual pixel sites is to basically hold some pixels in a reset state longer than others. So the overall exposure time is dictated by the pixel that requires the longest exposure, the other pixels are controlled to limit their exposure time by holding them in reset longer so their integration time is a fraction of the overall time.

In the paper, the total integration time is divided into integration slots of different duration, which are temporally arranged to have a common ending with the longest integration slot matching the total integration time. At the (potential) beginning of each integration slot (in the total integration interval), a pixel check occurs for each pixel. If saturation is predicted, the pixel is reset and allowed to integrate for a shorter period of time (the next integration slot). If saturation is predicted not to happen, the pixel is allowed to integrate for the remainder of the current integration slot. For any given pixel that has predicted saturation (i.e., over-exposure by the end of the total integration interval), the pixel check is repeated at the start of the next integration slot. So a given pixel can be reset numerous times during the total integration interval, if needed to keep that pixel from over-saturating.

The pixel site and A/D portion of the imaging device in said paper basically has a fixed dynamic range. Adjusting the exposures at individual exposure sites can increase the effective dynamic range of the device. In this fashion the resolution of the integration time is added to the resolution of the A/D converter. As a result, dim areas of the scene can be amplified by increasing the integration time so the full resolution of the pixel and A/D converter can be used. For bright areas of the scene, the integration time can be likewise reduced.

This technique could also be applied to produce an apparent logarithmic response to the imager. The pixel site response is basically linear but the brightness and integration time values for each pixel can be directly mapped to single logarithmic brightness values, which more closely emulates the human eye. Of course, other mathematical responses (such as a polynominal curve response) can also be implemented in a similar manner using the present invention.

In addition to the system disclosed in said paper, there is at least one imager with wide dynamic range that extends to very dim images. The imager sold under the trade designation HDRC by IMS Vision of Stuttgart, Germany has such capabilities. That imager is said to be capable of sensing over illumination levels of between 0.001 lux and 500,000 lux. It is a CMOS imager recommended for e.g., vehicle mounted cameras, welding and furnace monitoring, surveillance, vehicle night vision sensors, and security cameras.

Outside the CMOS area, there are other potential approaches. For example, there is a CCD chip sold by Fuji under the trade designation SuperCCD SR that has two separate photo detectors at each pixel site. One photo detector has much lower sensitivity than the other. This structure provides a way to discriminate between light and dark areas of the scene, without unnecessarily losing detail in either area.

Conventionally, image sensor wheel alignment systems use retroreflective targets mounted to the wheel tire assemblies, in combination with strobe lighting surrounding the imagers to help identify the regions of interest in the scene and to measure the relevant orientations of the targets. Retroreflective targets are, however, relatively expensive, while the strobe lighting can prove aggravating to the technician using the system.

There exists, therefore, room for improvement.

SUMMARY OF THE INVENTION

The present invention was developed to address these problems. Among the objects and features of the present invention is an improved image sensing wheel alignment system for measuring angles, distances, positions and orientations in wheel-mounted alignment systems and machine vision alignment systems.

A second object of the present invention is to provide such a system that has improved capabilities in challenging lighting conditions.

A third object of the present invention is to provide such a system that has improved capabilities in coping with specularities.

A fourth object of the present invention is to provide such a system that does not require special lighting.

A fifth object of the present invention is to provide such a system that may use less expensive components.

A sixth object of the present invention is to provide such a system that is capable of eliminating intensity gradients that affect image processing.

A seventh object of the present invention is to provide such a system that is capable of adjusting the uniformity of an image as the field of view changes with a resulting change in lighting conditions.

An eighth object of the present invention is to provide such a system that exposes two regions of interest (including wheels or targets, for example) at different exposure levels.

A ninth object of the present invention is to provide such a system that exposes two or more portions of a target or a wheel at different exposure levels.

A tenth object of the present invention is to provide such a system that captures images quickly in difficult lighting situations.

An eleventh object of the present invention is to provide such a system that captures images quickly from distant targets and from retroreflective targets at high tilt angles.

A twelfth object of the present invention is to provide such a system that has a faster update rate for wheel positions, and which allows the alignment process to be completed in a shorter time.

A thirteen object of the present invention is to provide such a system that allows a light source to be disposed at various positions with respect to the cameras of the system.

A fourteenth object of the present invention is to provide such a system that improves target brightness for distant targets.

In one aspect of the present invention, an improved image sensing wheel alignment system for calculating vehicle wheel alignments includes a detector array for receiving an input image containing vehicle wheel alignment information. The detector array has image detecting elements. In the context of the present invention, an element may be a single pixel, or may be a group of pixels. An image sensor controller controls the detector array to receive the input image during an acquisition period. The image sensor controller examines signals from the image detecting elements individually at a plurality of times during the acquisition period to determine whether the signals indicate probable over-exposure of image detecting elements by the end of the acquisition period. The image sensor controller is responsive to a signal indicating probable over-exposure of a particular image detecting element by the end of the acquisition period to reset said particular image detecting element. The system further includes circuitry for reading out an output image from the image detecting elements at the end of the acquisition period. The output image contains wheel alignment information for use in calculating vehicle wheel alignments, and has different exposure levels for different image detecting elements.

In a second aspect of the present invention, an image sensing wheel alignment system includes a high dynamic range imager having a sensitivity that extends to very dim images, and a continuous light source for illuminating a scene containing wheel alignment information. The imager receives digital information from the scene as illuminated by the continuous light source. Circuitry and software analyze the output of the imager to extract wheel alignment information.

In a third aspect of the present invention, an image sensing wheel alignment system includes an image detector for sensing an input image of a scene containing vehicle wheel alignment information. The image detector has a plurality of pixels disposed in an array, each pixel having at least first and second photo detectors, the first photo detector for each pixel has a first sensitivity to light and the second photo detector for each pixel has a second, substantially higher sensitivity to light. In response to the output levels of the photo detectors, the more appropriate photo detector for each pixel is selected. For instance, when the output of the higher sensitivity photo detector exceeds a predetermined level indicative of saturation, the lower sensitivity photo detector is selected. Vehicle wheel alignment information is extracted from measured values of the selected outputs.

In a fourth aspect of the present invention, a method of operating an image sensing wheel alignment system includes obtaining multiple input images of a scene containing wheel alignment information taken at different exposure levels and using different angles of illumination, at least some of the input images being taken at the same exposure levels but different angles of illumination, the input images falling on a detector array so as to create corresponding output images for each input image, and comparing at least some of the output images to classify scene elements as to smoothness and to determine positions of specularities in the scene. (For purposes of this application, a specularity is a highlight in an image, resulting from the reflection of light off a polished or semi-reflective object. The brightness of a specularity can be many times the brightness of its surroundings in the image.)

Further features and advantages of the present invention, as well as the structure and operation of various embodiments of the present invention, are described in detail below with reference to the accompanying drawings.

BRIEF DESCRIPTION OF THE DRAWINGS

The accompanying drawings, which are incorporated in and form a part of the specification, illustrate the embodiments of the present invention and together with the description, serve to explain the principles of the invention. In the drawings.

Similar reference numbers indicate similar parts throughout the several views of the drawings.

DETAILED DESCRIPTION OF THE PREFERRED EMBODIMENTS

Figure 1:
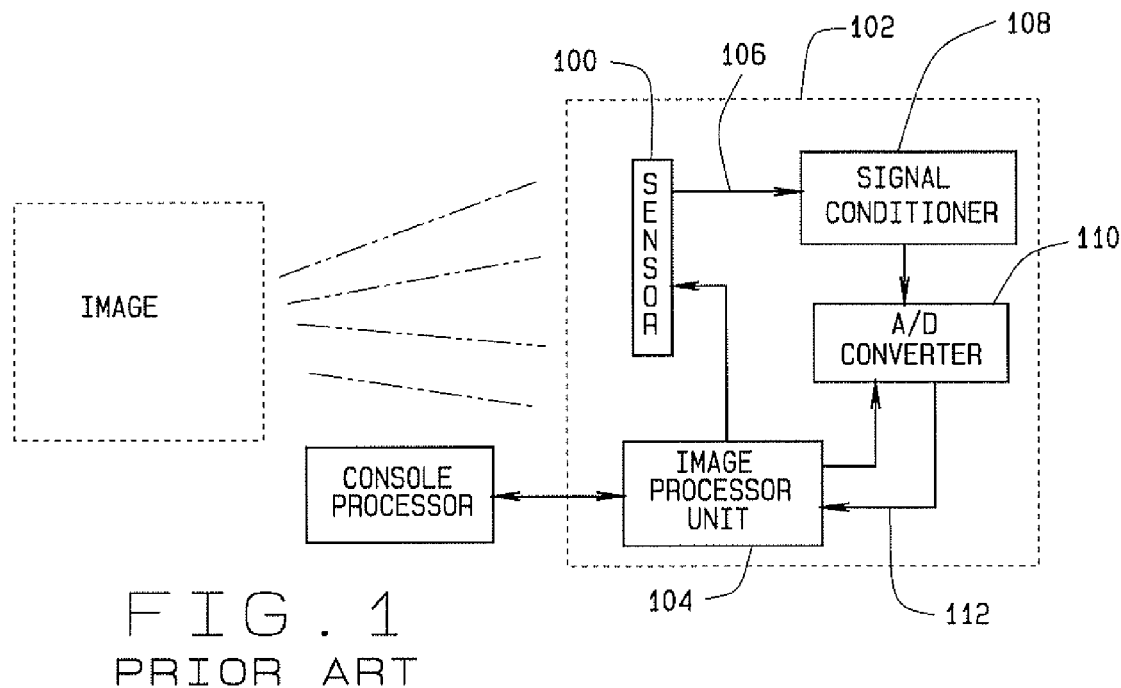
FIG. 1 illustrates a block diagram of a prior art image sensor and computer system for calculating vehicle wheel alignment using a wheel mounted sensor set.

Referring to the accompanying drawings, FIG. 1 illustrates a prior art image sensor used by a computer system to calculate vehicle wheel alignments. In prior art alignment systems, a solid state image sensor 100 is contained within a sensor head 102. Such a sensor head may be mounted on each wheel of the vehicle to work in combination with other sensor units, or the sensor head may be mounted at a distance away from the vehicle to view each wheel individually. An image processor unit 104 controls the sensor, and an analog signal 106 from the sensor passes through a signal conditioner 108 and an analog to digital converter 110. The processor receives a digitized image 112 from the converter, calculates the alignment angles using the image information and computational algorithms, and communicates with a console processor 114 to display the wheel alignment information to the user. As discussed above, the image processing illustrated in FIG. 1 must be performed on a separate digital circuit.

Figure 2:
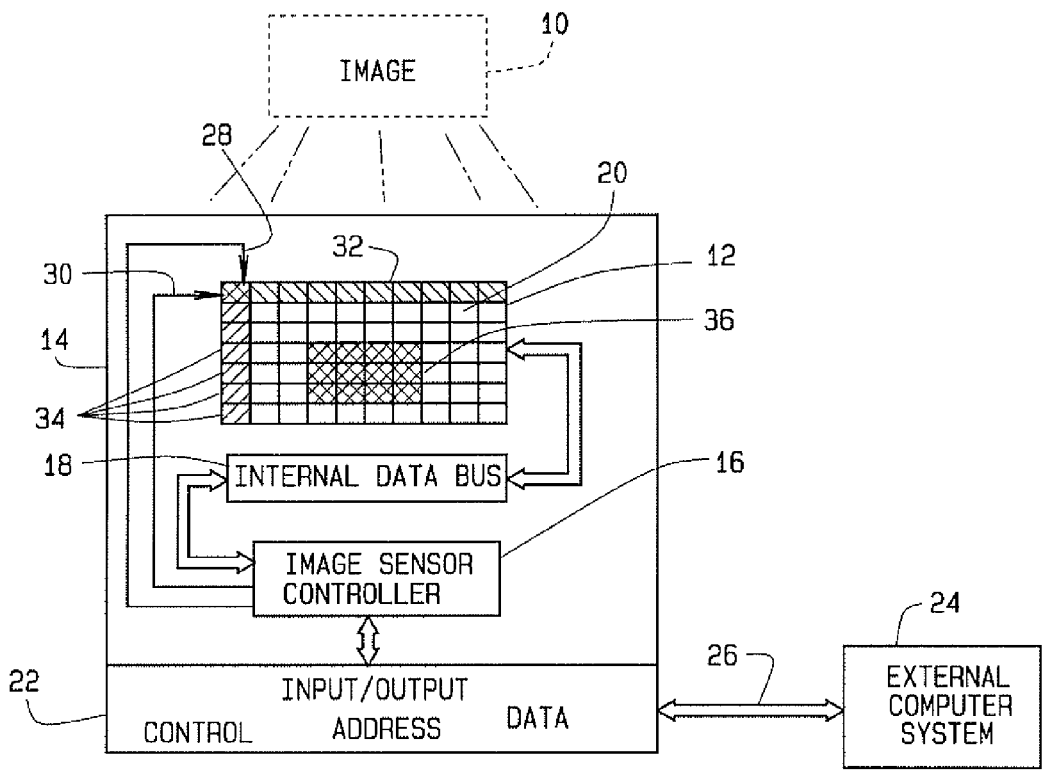
FIG. 2 illustrates a functional block diagram of an image sensor and computer system for calculating vehicle wheel alignment according to the present invention.

Referring to FIG. 2, a preferred embodiment of the present invention is illustrated. An input image 10 of a scene containing vehicle wheel alignment information is received by a detector array 12 that is formed on an integrated circuit 14. The circuit is fabricated using well known processes such as those for a complementary metal oxide semiconductor (CMOS). The integrated circuit also contains an image sensor controller 16 that communicates with the detector across an internal bus 18. The controller reads the output from a plurality of pixels 20 that comprise the array and sends signals that control the operation of the array. The controller also directs the input/output 22 for the integrated circuit, including signals for control, data and addresses, as it communicates with an external computer system 24 across an interface bus 26.

Each pixel 20 in the array has an address defined by its column 28 and row 30 in the array, incorporating one or more transistors at each site. Long exposure times or high intensity lights do not cause blooming because each pixel in the image detector is electronically isolated from the neighboring pixel and the excess charge of a saturated transistor bleeds into the integrated circuit's substrate. A single row 32 forms a linear detector array, and multiple rows 34 form a two-dimensional detector array. The image sensor controller 16 can define the pixel addresses to be read, making it possible to scan the sensor only in a region of interest (ROI) 36. There is no image smear because each pixel is read at its address and there is no need to transfer the charge from the pixel to another register for output.

In addition to preventing smearing, the present invention uses the addressable scanning capabilities of the integrated circuit to reduce the error in the scanned image with more efficiency and speed and with less cost than possible with the prior art devices described above. One source of error inherent in all imaging devices is counting or Poisson noise, and this error is best reduced by averaging multiple images of the same scene. Prior art devices must read out the entire image before averaging can be performed on even a portion of the image. The present invention can more efficiently process a particular region of interest (ROI) 36, such as the portion of the detector array 12 corresponding to the target or emitter source. The sub-array scan capability of the CMOS image sensor greatly reduces the processing burden and enhances the rate at which measurements can be made. In prior art systems, image averaging must be done by an off-chip processor or host computer, but image averaging could be accomplished on-chip using the integrated circuit design.

Figure 3:
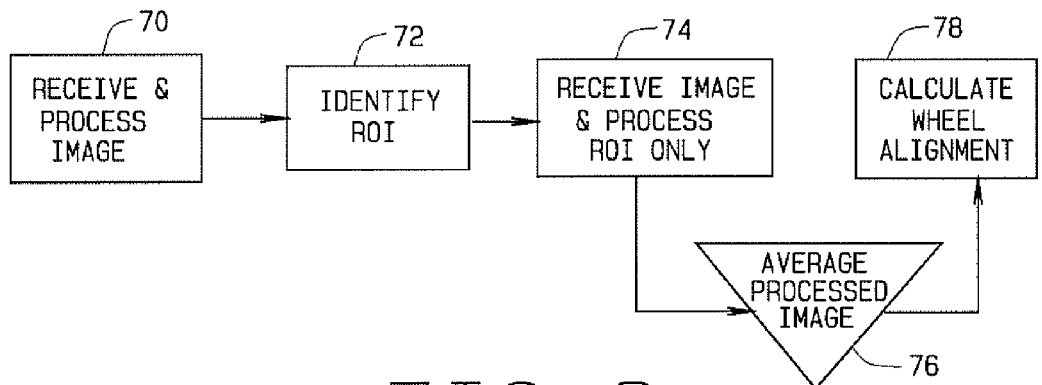
FIG. 3 illustrates a flow diagram for using the image sensor of FIG. 2 to reduce processing time in calculating vehicle wheel alignment in accordance with another aspect of the present invention.

Referring to FIG. 3, the first image is received and processed in its entirety in step 70. Either the integrated circuit or the computer system identifies a ROI on the detector that corresponds with the target image or emitter source image in step 72. The detector receives additional images; subsequent scans of the detector are limited to the ROI and processing is limited to the ROI in step 74. The ROI of multiple images are processed and the average processed image 76 is then used to calculate a wheel alignment in step 78. The entire process can be repeated automatically or can be manually reset.

Figure 4:
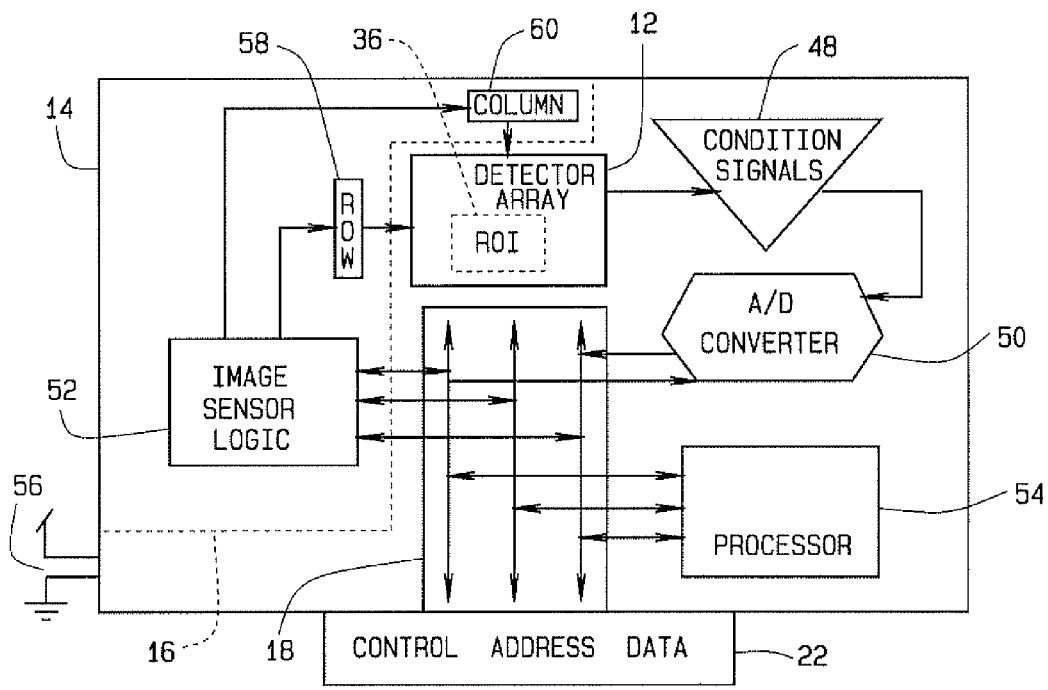
FIG. 4 illustrates an operational block diagram of the image sensor of FIG. 2.

Referring to FIG. 4, particular operations of the image sensor controller 16 and additional benefits of an integrated circuit 14 are now presented. An analog to digital converter 50 and a signal conditioning element 48 can be incorporated onto the integrated circuit, thereby decreasing the need for peripheral electronic elements. Additionally, image sensor logic 52 and a processor 54 can be programmed to create an application specific integrated circuit (ASIC). Depending on the ASIC, the processor can be a digital signal processor, a micro-processor, and/or a micro-controller processor. One such ASIC can be designed to calculate orientation and position in a machine vision alignment system, and another ASIC can be designed to calculate angles, distances and positions in a wheel-mounted alignment system. The ASIC design allows for calculation of the wheel alignment within the image sensor itself using the same computational algorithms that are found in current image-based wheel alignment systems. These chips can be updated or replaced as integrated circuit technology increases processing speeds and improves image resolution.

The processor's logic can be programmed to identify the ROI 36 which is then communicated on the internal bus and read by the image sensor controller. The image sensor logic limits further read outs of the detector array 12 to the ROI 36 by directing the row decoder 58 and the column decoder 60 to obtain data from only those pixel addresses that comprise the ROI. The ROI could be composed of alternate rows and/or columns of the full image or a portion thereof. Image decimation of different scales can be accomplished by varying the number of rows/columns skipped. The processor 54 can work with an external processor, if desired. The processor 54 can control the information sent to the external processor or host computer and may stop the processing of an entire image if the ROI is identified in the first image.

Another desirable feature of the integrated circuit image sensor is the ability to operate with a single input supply voltage 56. This is of most importance in portable devices but offers significant advantages for fixed installations because of the simplified circuitry requirements. The integrated circuit also uses much less power than a typical equivalent CCD imager. These properties decrease the amount of internal heating that must be considered when building a precision camera. The heating can distort the image by moving or warping the optics and mounting hardware of the imaging device. Heat can establish convection currents which can create index of refraction variations in the air spaces of the optical system and induce random distortions into the image. By keeping the power dissipation as low as possible the thermal aspects of the camera design become more manageable and allow economic solutions.

Further system simplification can be accomplished by taking advantage of the many types of computer interfaces that are possible with an image sensor that is formed on an integrated circuit. The image data can be transferred to a host computer by an on-chip direct parallel, universal serial bus (USB), a IEEE 1394 interface, or using a wireless protocol such as 802.11 g. This eliminates the need for a frame grabber which reduces cost and complexity. The image can be transferred to memory, with a direct memory access (DMA) peripheral, where it is immediately available for analysis by the system processor. The memory and processor can be located either in the sensor 14 itself or in the external computer system 24. Additionally, in wheel alignment systems using multiple integrated circuit image sensors, the sensors can communicate with each other through their respective communication links to the computer system. Alternatively or in addition to the communication links with the computer system, communication links can be established between the sensors themselves. In view of the foregoing, it will be seen that the several advantages of the invention are achieved and attained.

Figure 5:
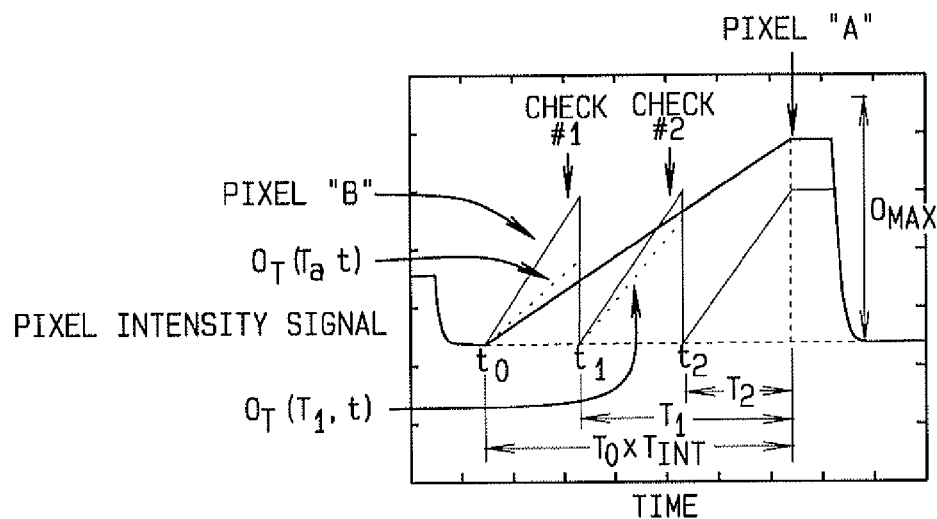
FIG. 5 illustrates integration timing for an imaging system used in the present invention.
Figure 6:
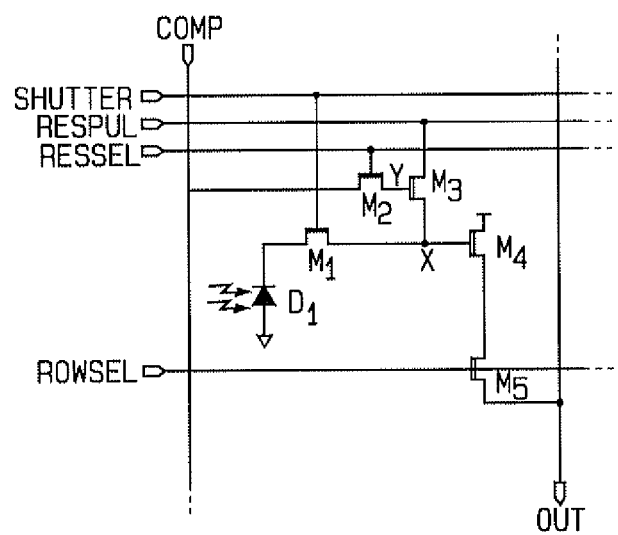
FIG. 6 illustrates circuitry of an individual pixel used in the imaging system of the present invention.
Figure 7:
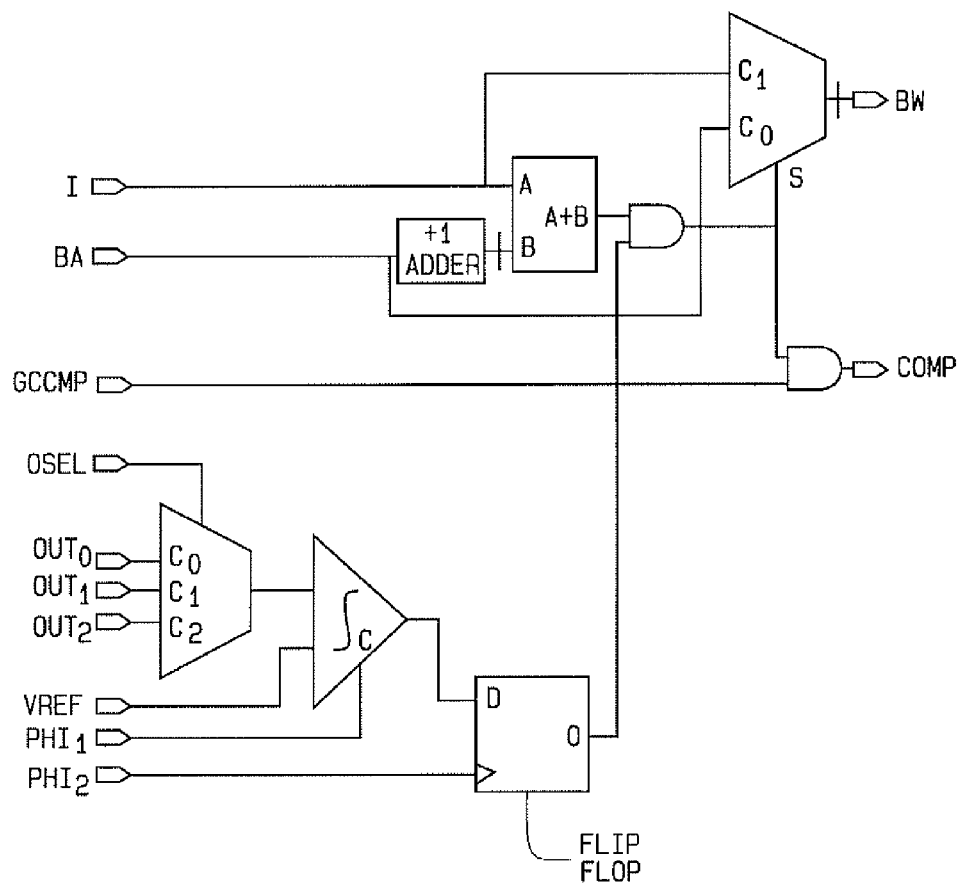
FIG. 7 illustrates integration controller circuitry for the imaging system.

In another embodiment of the present invention, it is preferred to use a CMOS image sensor such as that shown and described in the aforementioned paper of Acosta-Serafini et al. Such an image sensor operates as indicated in FIG. 5. The total integration time interval TINT is divided into subintervals T0, T1, and T2. Subinterval T0 equals interval TINT, while subinterval T1 is shorter, and subinterval T2 is shorter still, as shown. At the beginning of subintervals T1 and T2, the signal from each pixel is checked. If the value of the signal at that time indicates that the pixel (assuming constant illumination during the integration time) will over-saturate by the end of the total integration interval, then that pixel is reset, and starts integrating again. As can be seen in FIG. 5, pixel "B" at the beginning of both subintervals T1 and T2 exceeds the value (indicated by the dotted lines) that represents full saturation at the end of the total interval, so it is reset twice. Pixel "A" on the other hand, falls below the dotted line at Check #1, so it is allowed to integrate for the full integration time TINT. The circuitry for controlling the pixels in this manner is shown in FIGS. 6 and 7 and described in the aforementioned paper.

Although the paper describes a system using the assumption of constant illumination during the integration time, other assumptions may be made that correspond more accurately to the situation encountered in performing vehicle wheel alignments, as discussed in more detail below.

Figure 8:
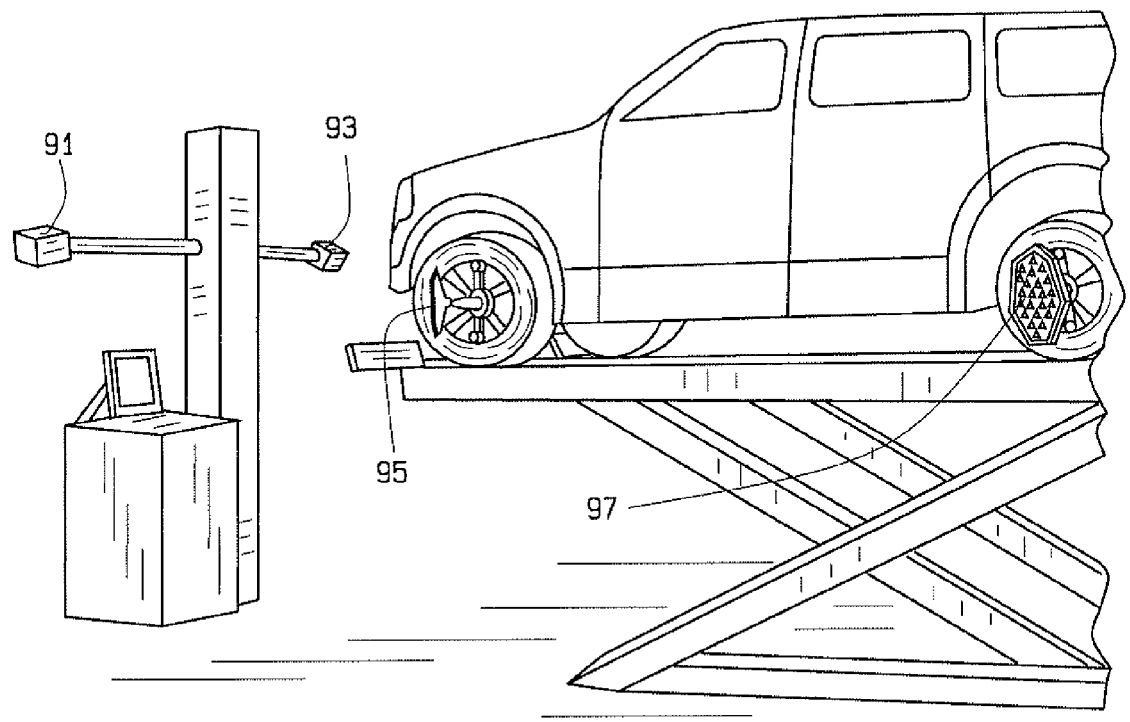
FIG. 8 is a perspective view of a wheel alignment system of the present invention.
Figure 9:
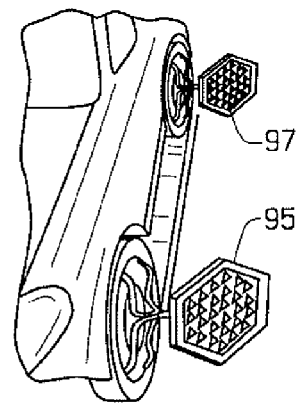
FIG. 9 is a perspective view showing a scene viewed by one of the cameras of the system of FIG. 8.

An imaging system, with the integration time of each pixel individually controllable, could be used in a wheel alignment system. As indicated in FIG. 8, such a system can include (for example) a set of cameras 91, 93 that monitor targets 95, 97 (and corresponding targets on the other side of the vehicle—not shown). From the point of view of the camera 91 (for example) the targets 95, 97 appear as shown in FIG. 9. As can well be appreciated, the illumination levels (including the background levels) can differ drastically for targets 95 and 97. The wheel alignment system, however, as part of its known process initially identifies the targets in the scene. At that point, the relative brightness of each target can be assessed, and the exposure level for each target (which would include many pixels in the camera) can be set so as to optimally expose both target 95 and target 97. As a result, the current need to acquire multiple images of the scene including the targets, at multiple exposure levels is eliminated. This increases system response time, and improves accuracy. That is, the pixel-by-pixel control of the integration time in the imager in the cameras can be advantageously used to control the exposure levels of regions of interest in the acquired image. Once the image is acquired with the varied exposure levels, it can be processed conventionally to extract the vehicle wheel alignment information.

Similarly, this system can be used to eliminate bright ambient light conditions by decreasing the exposures at those locations within the field of view. For example, in FIG. 9, bright sunlight coming from the right could wash out the image of the targets using conventional systems. The adaptive integration times used in the present invention prevents this effect.

Figure 10:
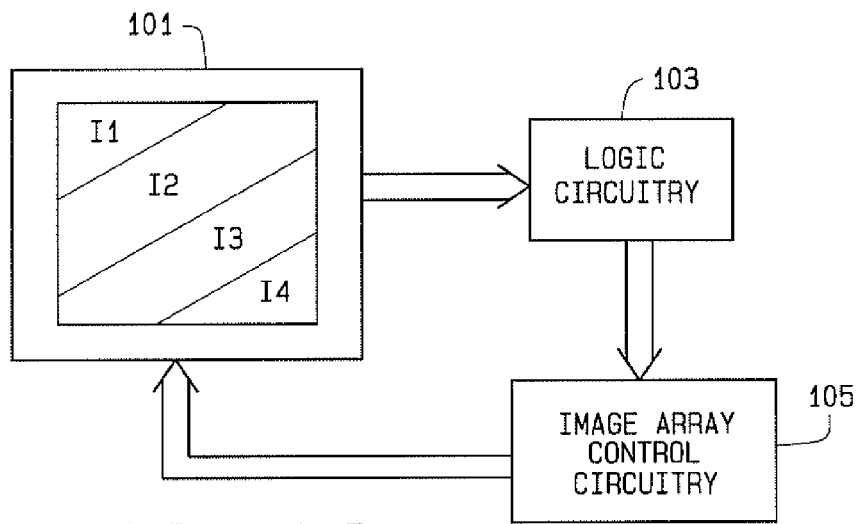
FIG. 10 is a block diagram of the present invention, illustrating a brightness gradient in the scene.

In addition, the present system advantageously adjusts exposure levels dynamically to account for brightness gradients due to illumination, reflection response, imager response or lens effects. That is, rather than just look at the levels of the individual pixels at each subinterval, the imaging array can be inspected by the logic circuitry for brightness gradients, and the integration times adjusted accordingly by the image controller circuitry, as indicated in FIG. 10. For example, an array 101 of the present invention, having the adaptive integration time as described above, has a brightness gradient indicated by intensity bands 11-14 in FIG. 10. The logic circuitry 103 (typically a microcomputer, digital signal processor, or the like, operating under programmed control) analyzes the image from array 101, detects the gradient, and in response has the image array control circuitry 105 (similar to that shown in FIGS. 6 and 7) to control the integration times across array 101 to take into account the brightness gradient.

It should also be appreciated that the present invention is also particularly suited for addressing the problems that arise from specular reflections in a camera's view. (Internal reflections caused by camera lenses and the like can also present problems, which are solved by the present invention.) The differences between two images that employ illumination from different angles can be explained either by shadow effects or by specular effects at smooth, shiny surfaces. High dynamic range of intensity of the present invention allows the precise location of the peak shine points. It is known to use dual cameras on each side of the vehicle-one for acquiring the target associated with the front wheel, and one for acquiring the target associated with the rear wheel—in machine vision alignment systems. But dual cameras can also be used in a different way. For example, each camera (such as camera 91 shown in FIG. 11) is preferably a dual camera 91A, 91B (see FIG. 11), each of which can be used to acquire basically the same image or target, but from a slightly different angle. The slight shift in location of an intensity peak that is one or more orders of magnitude more bright than adjacent matte surfaces is evidence that a difference between images acquired by these closely mounted cameras is a specularity, rather than a shadow effect. The high dynamic range of the present invention prevents the specularity from being saturated, so that known sub-pixel techniques allow identification of the image position shift caused by the change in illumination. Furthermore, precise knowledge of the positions of the illumination sources (adjacent the cameras for instance) provides cues as to surface orientation. In the absence of a high dynamic range imager of the present invention, the specularity analysis could be performed with use of multiple snapshots at different exposures. The multiple illumination technique permits classification of scene elements as representing either rough or smooth surfaces. Such surface smoothness cues and the aforementioned surface orientation cues would greatly improve the ability to correlate features across the multiple views of a stereo vision system. Prior art stereo vision systems are disclosed, for example, in U.S. Pat. Nos. 4,899,218, 6,397,164, 6,341,013, 5,532,816, and 5,731,870. These techniques would be especially beneficial to a non-contact automotive wheel-alignment system, since automobile wheels often have many smooth and shiny surfaces.

Figure 11:
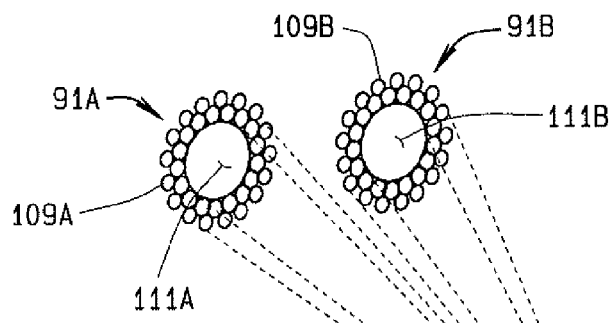
FIG. 11 is an illustration of a dual camera system of the present invention that addresses problems arising from specularities.

The combination of the specularity-identification techniques discussed above with a particular stereo camera 91 (FIG. 11) and illumination placement scheme could permit the use of specularities from convex, rounded surfaces as image features useful for stereo correlation. It is well known that specular reflections from shiny, rounded surfaces (such as surface 107) can confound stereo vision because the two camera views obtain the reflection of a point light source from different reflection points on the rounded surface. The stereo disparity angle of the specularity is such that the system identifies a scene feature lying beyond the true location of the rounded surface. A technique that avoids this problem involves two cameras 91A, 91B, each with an array of emitters 109A, 109B tightly packed around the lens 111A, 111B, such as shown in FIG. 11. At one moment, the left camera 91A acquires an image while only the right camera's emitter array 109B is active. At a later moment, the right camera 91B acquires an image while only the left camera's emitter array 109A is active. Due to geometric symmetry, the reflection of the right camera's emitter array in the left camera's image has bounced off the same location on the curved surface as has the reflection of the left camera's emitter array in the right camera's image. The specularity can be matched across the stereo pair by logic circuitry 103, and the disparity angle will map to an accurate location for the point of reflection on the curved surface in the scene. In addition, the surface orientation of the point of reflection is also known. This technique can be extended for use with stereo arrays of 3 or more cameras; specularities being processed using a pair of images at a time. A variation of this technique uses images acquired at one instant instead of two, by employing color. For example, the left camera's emitter array 109A emits red light, but its imager records only green light from the scene. Meanwhile, the right camera's emitter array 109B emits green light, but its imager records only red light. Alternatively, a single source of light having both types of light (such as a source of white light having both red and green light components) may be used.

With the improved imager dynamic range of the present invention, exposure algorithms can be greatly simplified, increasing the stability of the alignment vision system. This also speeds the response of the system, particularly in the case when a target 95, 97 (FIG. 8) is being acquired/reacquired. Searches for the target currently use multiple images at different exposures, but these can be replaced by a single image at one preselected exposure.

With improved dynamic range as described above, or as can be achieved with the aforementioned HDRC imager from IMS Vision, current strobed light sources 109A, 109B can be replaced with dimmer, continuous light sources, reducing cost and complexity. For example, such an imager is capable of operating in very dim light such as 10 to 100 Lux, as well as in bright light, such as 10,000 to 100,000 Lux. This also allows lighting gradients to be reduced by using less focused light sources, which can improve accuracy. These continuous light sources can also be used to assist the technician in the performance of other automobile maintenance tasks, instead of serving as a distraction (as strobed lights can do). In many cases, existing shop lighting will be sufficient to perform alignments using the present invention, further reducing costs.

High sensitivity achieved using the present invention also allows alignment targets currently made with retroreflective material to be replaced by printed targets. This reduces cost, and extends the range of the alignment system by eliminating the loss of target brightness at high tilt angles. These less expensive targets, for example, can be made with processes used for decals or membrane keyboards. Alternatively, the tire or wheel itself could be used as a target, since the target would no longer require retroreflective material.

The present invention also permits the system to more adequately cope with light sources that vary with time such as overhead fluorescent fixtures. The camera frame rate of cameras 91, 93, for example, is often much slower than the output frequency of the lights. The result is that there are several light "flashes" per camera exposure cycle. This is most apparent when the camera is used in rotating shutter mode. With a fixed integration time as occurs conventionally, the images exhibit light and dark bands. In conventional snap shot mode an additional light cycle could cause an area of the image to be overexposed as it is being read out. On the other hand, using the present invention, sub-sampling of the integration interval on a per pixel basis can dynamically follow the light cycles and provide uniform exposure for the entire image or any sub-section of it. This control is most useful when the subject of interest does not have a retroreflective property.

The algorithm in the paper mentioned above causes the data representing pixels that are predicted to over-saturate to be thrown away—only the signal from each pixel at the end of the interval TINT is kept. It is preferred that the sub-interval information be collected by the logic circuitry and averaged (or otherwise processed) to take advantage of the measurements taken at the subintervals. This reduces the noise at those pixels that are highly illuminated such as the triangles on a retroreflective target such as that shown in FIG. 9.

In the context of wheel alignment, it should also be noted that a non-contact vision type aligner could advantageously adjust the exposure levels for the low reflectance of the tire versus the high reflectance of the rim using the present invention, thus making a better image for processing the objects found on the tire.

Figure 12:
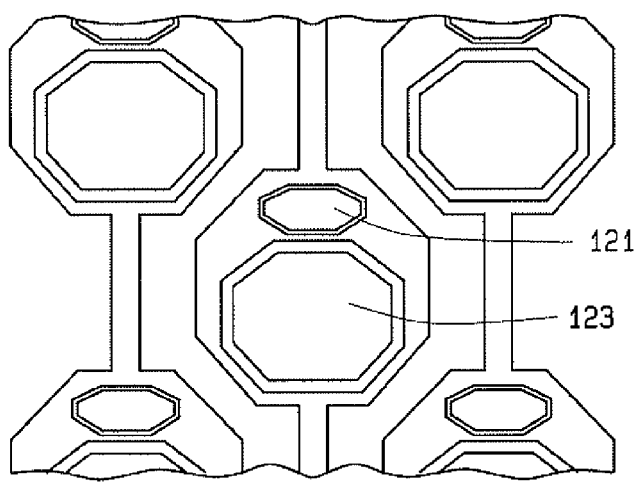
FIG. 12 is an illustration of a CCD imager useful in the present invention.

In FIG. 12, the pixel structure of the aforementioned Fuji SuperCCD SR chip is illustrated with two separate photo detectors 121, 123 at one pixel site. One photo detector (121) has much lower sensitivity than the other (123). This provides another way to discriminate between light and dark areas of the scene. It also provides a mechanism to simultaneously view a dimmer target in the distance and a closer brighter target using the same exposure time. Alternative methods of multiple photo detectors at one pixel site could also be used. For example, the imager sold under the trade designation X3 CMOS imager by Foveon could be used. Such imagers have different photo detectors stacked vertically, rather than the horizontal arrangement found in the Fuji SuperCCD SR chip. Both horizontal and vertical arrangements of photo detectors with different levels of sensitivity fall within the scope of the present invention. Co-assigned U.S. patent application Ser. No. 10/397,345, the disclosure of which is incorporated by reference, shows a vehicle alignment using such detectors.

It should be realized that the present invention with its ability to handle scenes with widely varying brightness levels during each exposure, and from exposure to exposure, has a number of possible applications. For example, in some cases the field of view of the cameras in vision based aligners can change. This can happen, for example, when the cameras are movable. Movement of the cameras will frequently result in brightness changes in the scene being viewed. The present invention, however, with its dynamic control of each detecting element, easily compensates for any resulting change in brightness (or change in brightness gradient) as the field of view changes.

The embodiments were chosen and described in order to best explain the principles of the invention and its practical application to thereby enable others skilled in the art to best utilize the invention in various embodiments and with various modifications as are suited to the particular use contemplated. As various modifications could be made in the constructions and methods herein described and illustrated without departing from the scope of the invention, it is intended that all matter contained in the foregoing description or shown in the accompanying drawings shall be interpreted as illustrative rather than limiting. For example, the pixels can be read destructively or non-destructively, and if further integration is required, the integrated circuit may be formed to include a NTSC encoder, a color processor, an electronic shutter function, and/or automatic gain control. Single chip cameras which incorporate some or all of these features are being produced by Photobit, Hyundai Electronics, ElecVision and others. Thus, the breadth and scope of the present invention should not be limited by any of the above-described exemplary embodiments, but should be defined only in accordance with the following claims appended hereto and their equivalents.

What is claimed is:

1. An improved image sensing wheel alignment system for calculating vehicle wheel alignments comprising:
   a detector array for receiving an input image containing vehicle wheel alignment information, said detector array having image detecting elements;
   an image sensor controller for controlling the detector array to receive the input image during an acquisition period, and further including circuitry for reading out an output image from the image detecting elements, said output image containing wheel alignment information for use in calculating vehicle wheel alignments, said output image including outputs from at least two image detecting elements obtained at different exposure levels during said acquisition period.

2. The image sensing wheel alignment system as set forth in claim 1 wherein the input image contains a plurality of points of interest, said output image having different exposure levels for at least some of the points of interest.

3. The image sensing wheel alignment system as set forth in claim 1 wherein the input image includes at least one portion illuminated by ambient light, the output image having a different exposure level for said ambient lighted portion.

4. The image sensing wheel alignment system as set forth in claim 1 wherein the system is responsive to brightness gradients over the input image to control the exposure level of the image detecting elements.

5. The image sensing wheel alignment system as set forth in claim 4 wherein the brightness gradient is due to illumination.

6. The image sensing wheel alignment system as set forth in claim 4 wherein the brightness gradient is due to reflection.

7. The image sensing wheel alignment system as set forth in claim 4 wherein the brightness gradient is due to image detecting element response.

8. The image sensing wheel alignment system as set forth in claim 4 wherein the brightness gradient is due to lens effects.

9. The image sensing wheel alignment system as set forth in claim 1 further including a first illumination source for illuminating a scene containing wheel alignment information from a first angle during a first interval, and a second illumination source for illuminating said scene from a second angle during a second interval, exposure of said scene during the first interval resulting in a first output image, and exposure of said scene during the second interval resulting in a second output image, the system including logic for analyzing differences between the first and second output images to identify specularities in the image.

10. The image sensing wheel alignment system as set forth in claim 9 wherein the logic uses subpixel techniques for analyzing said differences.

11. The image sensing wheel alignment system as set forth in claim 9 wherein the image detecting elements constitute a first image array associated with the first illumination source, further including a second image array associated with the second illumination source, the input images of the scene resulting from use of the first illumination source being received by the second image array, and the input images of the scene resulting from use of the second illumination source being received by the first image array, the exposure levels of both image arrays being controlled during the corresponding intervals, further including logic for comparing output images from the first and second arrays to determine positions of specularities in the output images.

12. The image sensing wheel alignment system as set forth in claim 9 wherein said image sensor controller is configured to control the image detecting elements to prevent saturation during each of said intervals.

13. The image sensing wheel alignment system as set forth in claim 1 wherein the input image includes at least one under exposed portion, said system being responsive to under exposure to increase the total acquisition time.

14. The image sensing wheel alignment system as set forth in claim 1 wherein the system is responsive to banding over the input image to control exposure level of the image detecting elements.

15. The image sensing wheel alignment system as set forth in claim 1 wherein the input image includes a target that contains no retroreflective material.

16. The image sensing wheel alignment system as set forth in claim 1 wherein a tire assembly is imaged.

17. The image sensing wheel alignment system as set forth in claim 14 wherein the banding is due to cycling of illumination sources at a higher rate than image acquisition cycles.

18. The image sensing wheel alignment system as set forth in claim 1 wherein the image sensor controller is responsive to brightness variations due to fluctuation in the brightness of artificial lighting during exposure times to control exposure levels of the image detecting elements.

19. The image sensing wheel alignment system as set forth in claim 1 further including a memory for saving signal values of each image detecting element, said signal values being capable of indicating over-exposure of image detecting elements, and logic for analyzing said saved values to reduce over-exposure.

20. The image sensing wheel alignment system as set forth in claim 19 wherein the saved signal values from individual image detecting elements in said detector array are averaged.

21. The image sensing wheel alignment system as set forth in claim 1 wherein the input image includes a vehicle tire assembly.

22. The image sensing wheel alignment system as set forth in claim 1 wherein the input image includes a target associated with a vehicle wheel to be aligned.

23. The image sensing wheel alignment system as set forth in claim 1 wherein the input image includes a target constructed with retroreflective material.

24. The image sensing wheel alignment system as set forth in claim 1 wherein the image sensor controller is responsive to a signal indicating probable over-exposure of a particular image detecting element by the end of the acquisition period to reset said particular image detecting element.

25. The improved image sensing wheel alignment system of claim 1 wherein said image sensor controller is configured to examine signals from the image detecting elements individually during the acquisition period.

26. The improved image sensing wheel alignment system of claim 1 wherein said detector array has an illumination sensitivity that extends from below 10 Lux to at least 10,000 Lux.

27. The improved image sensing wheel alignment system of claim 1 wherein a first portion of said image detecting elements have a first sensitivity to light, and wherein a second portion of said image detecting elements have a second sensitivity to light.

28. The improved image sensing wheel alignment system of claim 1 wherein said image detecting elements are configured to be reset to a first specified exposure level, during said image acquisition period, such that any image detecting elements having an exposure exceeding a second specified exposure level are reset to said first specified exposure level.

29. The improved image sensing wheel alignment system of claim 1 wherein each of said image detecting elements has a variable reset period, said variable reset period controlled by the system to alter an exposure of each of said associated image detecting elements during said image acquisition period.

30. An improved image sensing wheel alignment system for calculating vehicle wheel alignments comprising:
a first illumination source for illuminating a scene containing wheel alignment information from a first angle during a first interval;
a second illumination source for illuminating said scene from a second angle during a second interval
a detector array for receiving an input image containing vehicle wheel alignment information, said detector array having image detecting elements, said image detecting elements defining a first image array associated with the first illumination source, further defining a second image array associated with the second illumination source, wherein the input images of the scene resulting from use of the first illumination source are received by the second image array, and the input images of the scene resulting from use of the second illumination source are received by the first image array;
an image sensor controller for controlling the detector array to receive the input image during an acquisition period, and further including circuitry for reading out an output image from the image detecting elements, exposure of said scene during the first interval resulting in a first output image, and exposure of said scene during the second interval resulting in a second output image, said output images containing wheel alignment information for use in calculating vehicle wheel alignments;
a processor configured to control exposure levels of both image arrays during the corresponding intervals, and to analyze differences between the first and second output images to identify specularities in the image; and
wherein the first interval and the second interval are concurrent, the first image array being sensitive to light of a first color, and the second image array being sensitive to light of a second color.

31. A method for calculating vehicle wheel alignment angles with an image sensing wheel alignment system, comprising:
receiving, at a detector array having image detecting elements, an input image containing vehicle wheel alignment information;

controlling the detector array to receive said input image during an acquisition period;

accessing an output image from said image detecting elements acquired during said acquisition period, said output image containing outputs from at least two of said image detecting elements obtained at different exposure levels; and calculating at least one vehicle wheel alignment utilizing wheel alignment information contained within said output image.

32. The method of claim 31 wherein a first output from said image detecting elements is associated with scene illumination at a first angle;

wherein a second output from said image detecting elements is associated with scene illumination at a second angle; and wherein said step of calculating further includes analyzing differences between said outputs within said output image to identify specularities within said output image.

* * * * *